US012372612B2

(12) United States Patent
Born

(10) Patent No.: US 12,372,612 B2
(45) Date of Patent: Jul. 29, 2025

(54) SYSTEMS AND METHODS FOR ENHANCED RADAR PERFORMANCE CALCULATOR

(71) Applicant: THE BOEING COMPANY, Chicago, IL (US)

(72) Inventor: Andrew Vincent Born, Los Alamitos, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/670,671

(22) Filed: Feb. 14, 2022

(65) Prior Publication Data

US 2025/0216506 A1 Jul. 3, 2025

Related U.S. Application Data

(60) Provisional application No. 63/160,231, filed on Mar. 12, 2021.

(51) Int. Cl.
*G01S 7/40* (2006.01)
*G01S 13/86* (2006.01)
(Continued)

(52) U.S. Cl.
CPC ............ *G01S 7/4004* (2013.01); *G01S 13/86* (2013.01); *G01W 1/10* (2013.01); *G06F 16/29* (2019.01)

(58) Field of Classification Search
CPC ... G05B 2219/45016; G01S 2013/0272; G01S 7/4004; G01S 7/40; G01S 7/4008;
(Continued)

(56) References Cited

U.S. PATENT DOCUMENTS 4,499,469 A 2/1985 Kesterson
5,646,624 A 7/1997 Cope et al.
(Continued)

FOREIGN PATENT DOCUMENTS

CN 207249448 U 4/2018
CN 108761406 A 11/2018
(Continued)

OTHER PUBLICATIONS

Rashid, "Multifunction Radar Modeling in STK", Tech Tip, Sep. 23, 2019, Analytical Graphics, Inc, 3 pages, Available online at URL: https://www.agi.com/news/blog/september-2019/multifunction-radar-modeling-in-stk-11-7.
(Continued)

*Primary Examiner* — Lisa M Caputo
*Assistant Examiner* — Eric Sebastian Von Wald
(74) *Attorney, Agent, or Firm* — Alleman Hall & Tuttle LLP

(57) ABSTRACT

A radar performance analysis calculator system is provided. The system includes a server computer device including at least one processor in communication with at least one memory device. The at least one processor is programmed to receive information about a radar device to be analyzed, retrieve a plurality of parameters associated with the received information, receive a geographic location for the radar device, retrieve geographic data about a geographic region associated with the geographic location for the radar device, and compute one or more measures of performance for the radar device based on the plurality of parameters and the geographic data.

20 Claims, 11 Drawing Sheets

(51) Int. Cl.
  *G01W 1/10* (2006.01)
  *G06F 16/29* (2019.01)
(58) Field of Classification Search
  CPC ...... G01S 7/4013; G01S 7/4021; G01S 13/86;
    G01S 13/426; G01S 13/66; G01S 13/30;
    G01C 21/1652; G06F 16/29; G01W 1/10
  See application file for complete search history.

(56) References Cited

U.S. PATENT DOCUMENTS

| | | | |
|---|---|---|---|
| 7,860,335 B2 | 12/2010 | Murata et al. | |
| 8,098,192 B1* | 1/2012 | Wichgers | G01S 13/953 342/63 |
| 8,279,106 B1 | 10/2012 | Wittenberg et al. | |
| 9,310,477 B1 | 4/2016 | Sampigethaya | |
| 9,775,055 B2 | 9/2017 | Born | |
| 10,281,563 B2 | 5/2019 | Mende | |
| 10,707,575 B1* | 7/2020 | Zarubica | H01Q 3/28 |
| 10,732,261 B1* | 8/2020 | Wang | G01S 7/417 |
| 2003/0023412 A1 | 1/2003 | Rappaport et al. | |
| 2007/0085730 A1* | 4/2007 | Tsunoda | G01S 7/4004 342/171 |
| 2010/0256840 A1* | 10/2010 | Call | G01S 5/02522 701/17 |
| 2012/0086596 A1* | 4/2012 | Insanic | G01S 7/003 342/26 D |
| 2012/0143808 A1* | 6/2012 | Karins | G06N 7/01 706/46 |
| 2014/0354468 A1* | 12/2014 | Yanagi | G01S 7/4008 342/173 |
| 2015/0256401 A1 | 9/2015 | Zinger et al. | |
| 2017/0090014 A1* | 3/2017 | Subburaj | G01S 7/4056 |
| 2017/0102459 A1* | 4/2017 | Sakamoto | G01S 7/40 |
| 2017/0160381 A1* | 6/2017 | Cho | G01S 7/4004 |
| 2018/0059213 A1* | 3/2018 | Wallstedt | H04K 3/226 |
| 2019/0137624 A1* | 5/2019 | Goto | G08G 3/02 |
| 2019/0187720 A1* | 6/2019 | Fowe | G01C 21/3676 |
| 2021/0103050 A1* | 4/2021 | McEwan | G01S 13/34 |
| 2021/0325507 A1* | 10/2021 | Habib | G01S 13/22 |
| 2022/0163462 A1* | 5/2022 | Murphy | G01S 7/027 |
| 2022/0365171 A1* | 11/2022 | Martinez | G01S 13/284 |

FOREIGN PATENT DOCUMENTS

| | | | | |
|---|---|---|---|---|
| CN | 109254558 A | | 1/2019 | |
| CN | 110632572 A | * | 12/2019 | G01S 7/41 |
| CN | 110726977 A | | 1/2020 | |
| JP | 2010249748 A | * | 11/2010 | |
| KR | 2014076804 A | | 6/2014 | |
| RU | 166911 U1 | | 12/2016 | |

OTHER PUBLICATIONS

Abunuar, "Design Interface of Radar Equation by using MATLAB", International Journal of Engineering Science Invention, Jul. 2017, vol. 6 Iss. 7, pp. 46-53, Available online at URL: http://www.ijesi.org/papers/Vol(6)7/H06074653.pdf.

* cited by examiner

Input RADAR parameters

402 — Frequency for RADARs. UNIT: Megahertz (MHz)
- Frequency of RADAR 1 _____
- Frequency of RADAR 2 _____
412 — • Frequency of jammer 1 _____

404 — RF Bandwidth of RADARs. Unit: Megahertz (MHz)
- RF Bandwidth of RADAR 1 _____
414 — • RF Bandwidth of RADAR 2 _____
- RF Bandwidth of jammer 1 _____

406 — Gain of antenna for RADARs: Unit: dBi
416 — • Gain of antenna for RADAR 1 _____
- Gain of antenna for RADAR 2 _____
- Gain of antenna for jammer 1 _____

408 — Transmit power for RADARs. Unit: Watts (click here for dBW)
418 — • Transmit power for RADAR 1 _____
- Transmit power for RADAR 2 _____
- Transmit power for jammer 1 _____

410 — Modulation for RADARs. Unit (none). Use pulldown menu
420 — • Modulation for RADAR 1 _____
- Modulation for jammer 1 _____

FIG. 4

Input from user to web service via XML

```
<? Input file: Location and RADAR parameter information in XML format ?>
<location of node 1>42.12345, 171.45632, 1000.000 </location of node 1>
<location of node 2>42.32345, 172.45632, 1000.000 </location of node 2>
<location of node 3>42.53450, 173.45632, 1000.000 </location of node 3>    } 602
<location of node 4>44.32345, 174.45632, 1000.000 </location of node 4>
<location of node 5>48.32345, 173.45632, 1000.000 </location of node 5>
<Frequency of RADAR 1 >, 980,<\Frequency of RADAR 1>
<Frequency of RADAR 2 >, 980,<\Frequency of RADAR 2>
<Frequency of RADAR 3 >, 980,<\Frequency of RADAR 3>     } 604
<Frequency of RADAR 4 >, 980,<\Frequency of RADAR 4>
606 <Frequency of RADAR 5 >, 980,<\Frequency of RADAR 5>
   <Frequency of jammer 1>,980,<\Frequency of jammer 1>
<RF Bandwidth of RADAR 1>,20,<\RF Bandwidth of RADAR 1>
<RF Bandwidth of RADAR 2>,20,<\RF Bandwidth of RADAR 2>
<RF Bandwidth of RADAR 3>,20,<\RF Bandwidth of RADAR 3>   } 608
<RF Bandwidth of RADAR 4>,20,<\RF Bandwidth of RADAR 4>
610 <RF Bandwidth of RADAR 5>,20,<\RF Bandwidth of RADAR 5>
   <RF Bandwidth of jammer 1>,30,<\RF Bandwidth ofjammer 1>
<Gain of antenna for RADAR 1>,12,<\Gain of antenna for RADAR 1>
<Gain of antenna for RADAR 2>,12,<\Gain of antenna for RADAR 2>
<Gain of antenna for RADAR 3>,12,<\Gain of antenna for RADAR 3>   } 612
<Gain of antenna for RADAR 4>,12,<\Gain of antenna for RADAR 4>
614 <Gain of antenna for RADAR 5>,12,<\Gain of antenna for RADAR 5>
   <Gain of antenna for jammer 1>,20,<\Gain of antenna for jammer 1>
<Transmit power for RADAR 1>,50,<\Transmit power for RADAR 1>
<Transmit power for RADAR 2>,50,<\Transmit power for RADAR 2>
<Transmit power for RADAR 3>,50,<\Transmit power for RADAR 3>   } 616
<Transmit power for RADAR 4>,50,<\Transmit power for RADAR 4>
618 <Transmit power for RADAR 5>,50,<\Transmit power for RADAR 5>
   <Transmit power for jammer 1>,500,<\Transmit power for jammer 1>
<modulation for RADAR 1>,QPSK,<\Modulation for RADAR 1>
620 <modulation for jammer 1>,QPSK,<\Modulation for jammer 1>
                                                              622
```

FIG. 6

SYSTEMS AND METHODS FOR ENHANCED RADAR PERFORMANCE CALCULATOR

CROSS REFERENCE TO RELATED APPLICATIONS

This application claims priority to U.S. Provisional Application No. 63/160,231, filed Mar. 12, 2021, which is hereby incorporated by reference in its entirety.

BACKGROUND

The field of the present disclosure relates generally to calculating radar performance and, more specifically, to the prediction of the measurement of performance of radar signals from a radar unit at a plurality of locations.

Radar signal performance may be affected by numerous technical and environmental factors. Technical parameters of the radar such as power level, antenna gain, processing gain, frequency, and field of view may affect signal strength. Physical distance from the radar, weather, and other environmental conditions between the radar and a chosen location may be significant factors in radar signal performance. Natural terrain, such as mountains or trees, and manmade objects, such as buildings towers, or vehicles, may also obstruct or retard radar signal transmissions. Radar users, such as search and rescue, aircraft flight controllers, aircraft operators, ship operators, package delivery, and autonomous vehicle operators and manufacturers are interested in knowing the limitations of the radar that they rely on for safe operation. Many current systems make assumptions about one or more variables, round values off, use data inconsistently and wrongly across multiple disparate systems, and ignore some of the potential issues in calculating the performance of a radar unit. Furthermore, much of the information needed to calculate such radar performance is separated to a plurality of different systems that are not configured to communicate with each other and which use different units and values. Therefore, it would be advantageous to have a method and apparatus that takes into account the different variables, systems, and factors that affect performance of a radar unit.

BRIEF DESCRIPTION

In one aspect, a radar performance analysis calculator system is provided. The performance analysis calculator system includes a server computer device. The server computer device includes at least one processor in communication with at least one memory device. The at least one processor is programmed to receive information about a radar device to be analyzed. The at least one processor is also programmed to retrieve a plurality of parameters associated with the received information. The at least one processor is further programmed to receive a geographic location for the radar device. In addition, the at least one processor is programmed to retrieve geographic data about a geographic region associated with the geographic location for the radar device. Moreover, the at least one processor is programmed to compute one or more measures of performance for the radar device based on the plurality of parameters and the geographic data.

In another aspect, a method for radar performance analysis is provided. The method is implemented by a computer device including at least one processor in communication with at least one memory device. The method includes receiving information about a radar device to be analyzed. The method also includes retrieving a plurality of parameters associated with the received information. The method further includes receiving a geographic location for the radar device. In addition, the method includes retrieving geographic data about a geographic region associated with the geographic location for the radar device. Moreover, the method includes computing one or more measures of performance for the radar device based on the plurality of parameters and the geographic data.

In still another aspect, a radar performance analysis calculator computer device is provided. The radar performance analysis calculator computer device includes at least one processor in communication with at least one memory device. The at least one processor is programmed to receive information about a radar device to be analyzed. The at least one processor is also programmed to retrieve a plurality of parameters associated with the received information. The at least one processor is further programmed to receive a geographic location for the radar device. In addition, the at least one processor is programmed to retrieve geographic data about a geographic region associated with the geographic location for the radar device. Moreover, the at least one processor is programmed to compute one or more measures of performance for the radar device based on the plurality of parameters and the geographic data.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements, which are presently discussed, it being understood, however, that the present embodiments are not limited to the precise arrangements and instrumentalities shown, wherein:

FIG. 4 illustrates another example graphical user interface for providing and receiving information about a radar device shown in FIG. 1.

FIG. 6 illustrates an example data file providing information about the radar device from the client device to the RPAC computer device all shown in FIG. 1.

DETAILED DESCRIPTION

Figure 1:
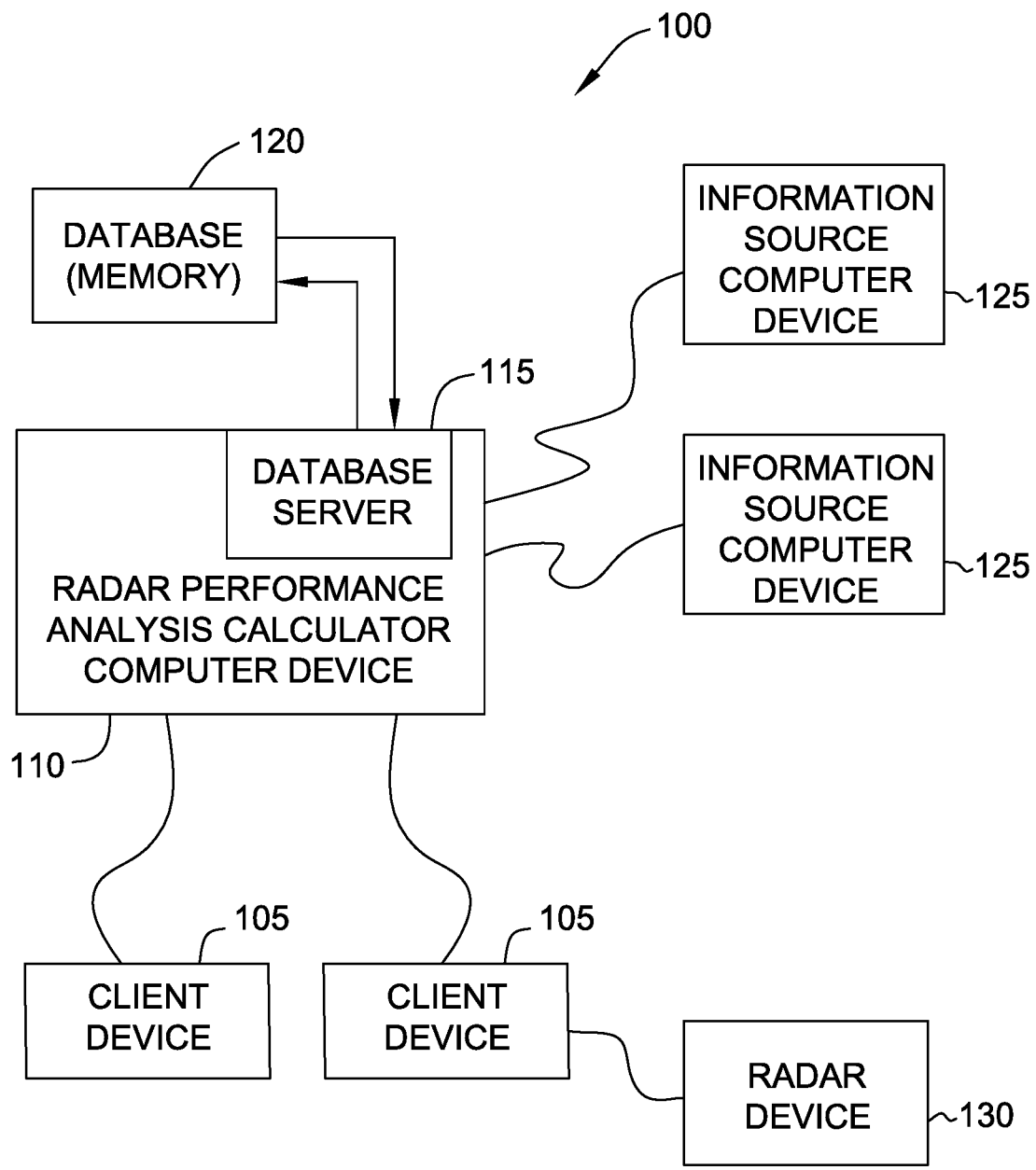
FIG. 1 illustrates a block diagram of a system for calculating performance of a radar performance analysis calculator (RPAC) system, in accordance with one embodiment of the present disclosure.

The implementations described herein relate to systems and methods for calculating radar performance and, more specifically, to the prediction of the measurement of performance of radar signals from a radar unit at a plurality of locations. More specifically, a radar performance analysis calculator ("RPAC") computer device is provided for calculating radar performance attributes. The embodiments described herein can assist in the placement and design of radar devices, as well as, determining the probability that a radar device can detect a desired object or target.

The systems and methods described herein recognize that signal strength of radar devices can be affected by distance, terrain (both natural and manmade), and weather conditions between the radar device and any target that the radar device is attempting to detect. In some embodiments, jamming or interference effects need to be considered. For example, radar devices at airports may be required to detect airborne targets up to 50 miles away, including targets from the size of a piper cub light aircraft to a commercial jet aircraft. The placement of the radar device(s) for this aircraft need to take into account the terrain, including natural terrain, such as hills, and manmade terrain, such as power lines and buildings. The radar device(s) also need to take into account the different weather conditions that occur around the airport. If only clear conditions are analyzed, then problems may occur during foggy conditions and/or strong storms. In another example, the radar device can be mobile, such as a search and rescue aircraft. The operator of the radar device needs to know if the radar device may identify a raft out in the ocean. Furthermore, the operator needs to take into account the weather conditions, such as whether the water is calm and flat or if there are ten-foot high swells.

The systems and methods described herein related to a web service accessible from a web browser on a client device that allows a user to enter information about radar device(s) and the targets to detect and their corresponding locations. The web service is a radar performance analysis calculator that receives the radar device and location information. The radar performance analysis calculator accesses sources of information about weather, natural terrain, and urban or manmade terrain between the radar device and the targets to be detected. The sources of information may be publically available databases or other data sources and may be accessible via the Internet or other wide area network. By having the radar performance analysis calculator offered as a web-service, the user does not need significant processing power or ready access to a plurality of information databases. Accordingly, a user in the field can use the web service on a smartphone or other device.

Based on the radar information and the operating environment information gathered from the other sources, the radar performance analysis calculator might generate and provide a measure of performance of the received signal strength. The measure of performance may be a prediction of the probability of detection of the target to be detected. The measure of performance may also include the received operating characteristic (ROC) curve and quality of service (QoS) measurements.

The radar devices can be stationary or in motion. Radar devices can be mounted aboard spacecraft, aircraft, watercraft, vehicles, or satellites. For example, radar devices have been mounted aboard autonomous and semiautonomous automobiles for detecting traffic, road obstacles, bicycle riders, and pedestrians. While in some embodiments, the web service provided by the radar performance analysis calculator can be accessed by a user entering location and other information into a web browser at a client device, in other embodiments location information may be generated and transmitted automatically without user involvement. For example, a global positioning system (GPS) device may continually generate updated location information for a moving radar device. The location information can be automatically submitted on a periodic basis to the radar performance analysis calculator for predictions of measures of performance. Global positioning system information may be transmitted to the radar performance analysis calculator via a satellite connection. Current weather information can also be automatically transmitted to the radar performance analysis calculator to keep the predictions and measures of performance up to date. Weather information includes tropospheric weather (wind, clouds, dust storms, etc.), ionospheric weather (how radio waves are effected or reflected by the ionosphere during day vs night), or solar events (e.g. a geomagnetic storm can cause radars to have 300 meter errors. "Typically, the range residuals are about 0±30 m, as shown in the top plot. During the geomagnetic storm, the residuals were significantly higher, up to 350 m") Furthermore, geographic data can be updated on a regular (periodic) basis to ensure that new structures and other manmade terrain do not adversely affect the performance of the radar device.

Users of the radar performance analysis calculator may use the measure of performance to make determinations about whether a particular radar device will meet quality of service (QoS) requirements under certain operating conditions. Because the illustrative embodiments provide the radar performance analysis calculator as a web service, a user may benefit from technical effects that promote access of the radar performance analysis calculator from a web browser without the need to load any special software or hardware. Illustrative embodiments provide further beneficial technical effects promoting more informed selection of radar devices given a user's needs and operating environment.

In addition to accepting input from a user via a web browser, the radar performance analysis calculator may accept data provided in extensible markup language (XML) format, in binary format, and in several distributed simulation formats, for example standard IEEE-1278 (Distributed Interactive Simulation) issued by the Institute of Electrical and Electronics Engineers (IEEE). The radar performance analysis calculator may enable numerous simultaneous calculations wherein if a user enters locations for a number of radar devices, then the radar performance analysis calculator may predict radar signal performance for links between each of the number of radars and the targets to be detected and may depict the predicted signal performance using a map.

Described herein are computer systems such as the RPAC computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a block diagram of a radar performance analysis calculator ("RPAC") system 100 for calculating performance of a radar device 130, in accordance with one embodiment of the present disclosure.

The RPAC system 100 includes a plurality of client devices 105 in communication with a radar performance analysis calculator ("RPAC") computer device 110. The RPAC computer device 110 is in communication with a database server 115 for retrieving and storing data in a database 120. The RPAC computer device 110 is also in communication with one or more information source computer devices 125 to provide additional information to the RPAC computer device 110.

The RPAC computer device 110 is programmed to receive a request to analyze a radar device 130 from a client device 105. The client device 105 can provide information about the radar device 130 to the RPAC computer device 110. The RPAC computer device 110 can also look up information about the radar device 130, the surrounding terrain, and the weather conditions from one or more databases 120. The RPAC computer device 110 can also communicate with one or more information sources computer devices 125. The information source computer devices 125 can provide information about the radar device 130, the target to be identified, the surrounding terrain, both natural and manmade, and the weather conditions.

In the example, client devices 105 are computers that include a web browser or a software application, which enables client devices 105 to communicate with the RPAC computer device 110 using the Internet, a local area network (LAN), or a wide area network (WAN). In some examples, the client devices 105 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 105 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client devices 105 include a web browser that can be used to request predictions from the RPAC computer device 110. In another example, the client device 105 is in communication with a radar device 130. The client device 105 can provide updated parameters, such as power settings, based on the current performance analysis of the radar device 130, such as due to changing weather conditions.

The RPAC computer device 110 includes at least one application executing on the RPAC computer device 110 to perform the radar performance analysis. The application includes the radar performance analysis calculator and supporting software components. The application may be provided as a cloud-based web-service over the Internet or other network.

A database server 115 is communicatively coupled to a database 120 that stores data. In one example, the database 120 is a database that includes a plurality of radar parameters, a plurality of analysis and calculation equations, and additional information about radar devices. In some examples, the database 120 is stored remotely from the RPAC computer device 110. In some examples, the database 120 is decentralized. In the example, a person can access the database 120 via the client device 105 by logging onto RPAC computer device 110.

In the example, information source computer devices 125 are computers that include a web browser or a software application, which enables information source computer devices 125 to communicate with the RPAC computer device 110 using the Internet, a local area network (LAN), or a wide area network (WAN). In some examples, the information source computer devices 125 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 105 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. The information source computer devices 125 can be accessed by the RPAC computer device 110 to access data to use in making radar performance calculations and analysis. Information source computer devices 125 can include natural terrain data, urban terrain data, weather information, and any other data necessary for radar performance calculations and analysis. Information source computer devices 125 may be publically or privately available sources of information. Information source computer devices 125 can be web sites available via the Internet, databases or other data stores, commercial data services, electronic media stored in a local area network, or other local network that the RPAC computer device 110 can access.

The information source computer device(s) 125 associated with natural terrain can include at least one source of data about natural terrain that may obstruct or otherwise affect radar performance. Natural terrain may include mountains, valleys, trees, and bodies of water, as well as the ionosphere, which can reflect or degrade radar signals. The information source computer device(s) 125 may observe, for example, the Digital Terrain Elevation Data (DTED) standard of digital datasets that may consist of at least one matrix of terrain elevation values.

The information source computer device(s) 125 associated with urban terrain data source can include at least one source of data about non-natural or manmade terrain that may obstruct or otherwise affect radar performance. Such terrain may include buildings, bridges, towers, highways, ports, railroad lines, airports, power lines, and other manmade structures or other objects. Such terrain may also include air traffic control radars at airports or radio and TV towers, which may interfere or jam radar transmission.

The information source computer device(s) 125 associated with weather information source may be at least one source of data about weather that is proximate the radar device, the target to be detected, or combinations thereof. Weather systems, humidity, and air quality may affect radar performance. Weather includes both tropospheric weather, that may include precipitation and dust storms, as well as ionospheric weather, for example solar storm activity that may cause scintillation and degradation.

The radar device 130 is a detection system that uses radio waves to determine the range, angle, and/or velocity of objects. The radar device 130 can be used to detect aircraft, watercraft, spacecraft, ground craft, other vehicles, weather formations, and terrain. A radar device 130 consists of a transmitter producing electromagnetic waves in the radio or microwaves domain, a transmitting antenna, a receiving antenna (often the same antenna is used for transmitting and receiving) and a receiver and processor to determine properties of the object(s). The processor can be client device 105. Radio waves (pulsed or continuous) from the transmitter reflect off the object and return to the receiver, giving information about the object's location and speed. Other systems similar to radar devices 130 make use of other parts of the electromagnetic spectrum and may be analyzed by one having skill in the art using the systems and methods described herein.

Figure 2:
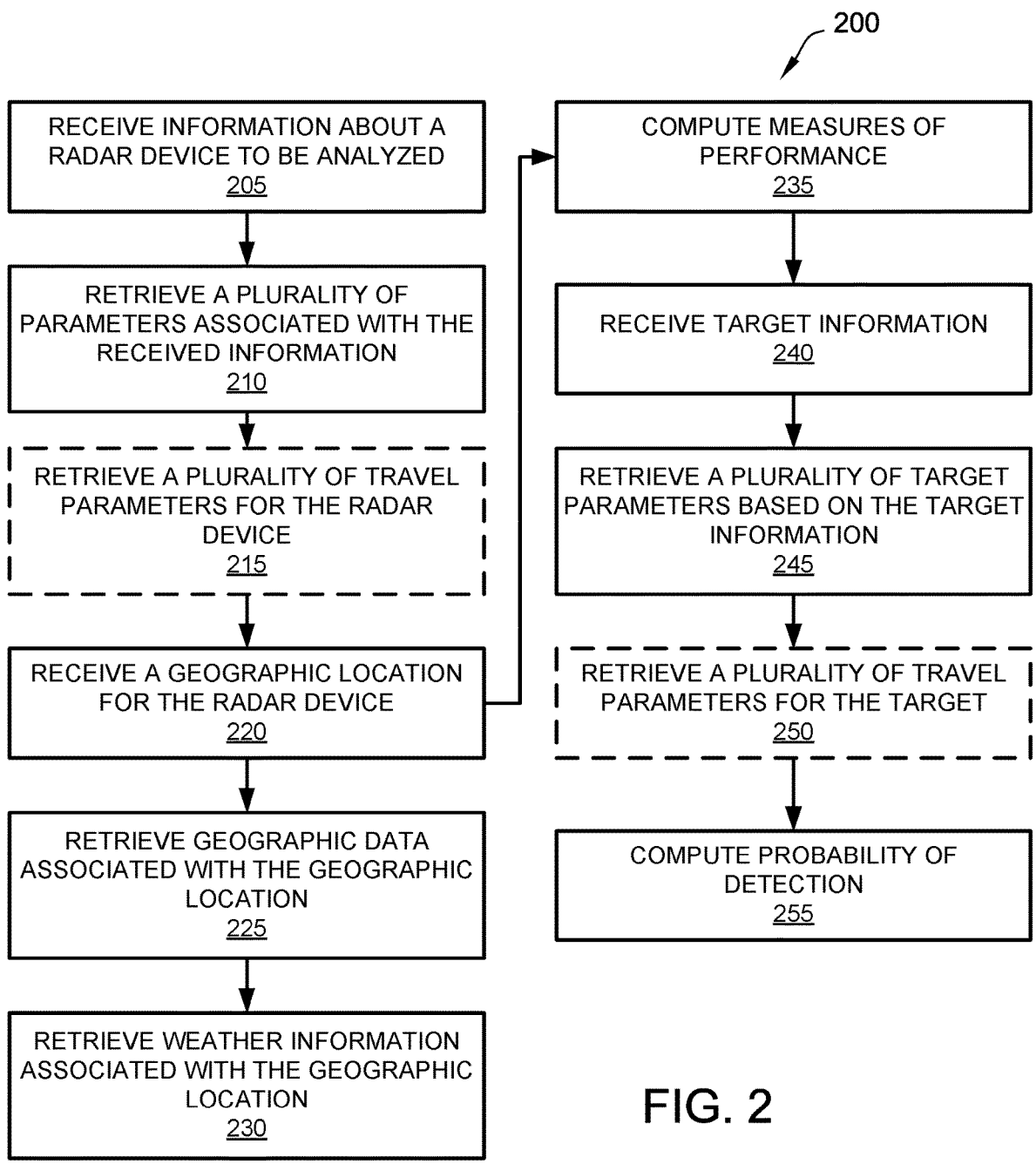
FIG. 2 illustrates a process for calculating performance of the radar device shown in FIG. 1 a probability of detecting a target using the RPAC system shown in FIG. 1.

FIG. 2 illustrates a process 200 for calculating performance of a radar device 130 (shown in FIG. 1) and a probability of detecting a target using the radar performance analysis calculator (RPAC) system 100 (shown in FIG. 1). Process 200 can be executed by the RPAC computer device 110 (shown in FIG. 1).

The RPAC computer device 110 receives 205 information about a radar device 130 to be analyzed. The RPAC computer device 110 can receive 205 the information from a client device 105 (shown in FIG. 1), where a user enters the information via a web-based user interface, such as through graphical user interfaces 300 and 400 (shown in FIGS. 3 and 4). The information can include identifying information about the radar device 130 and location information for the radar device 130. The identifying information about the radar device 130 may vary from a make and model the radar device 130, such as from a pull-down list on the website, to a type, to a plurality of the operating parameters of the radar device 130. The types of radar devices 130 on the list may include commercial off-the-shelf (COTS) and government off-the-shelf (GOTS) radars.

The RPAC computer device 110 retrieves 210 a plurality of parameters for the identified radar device 130 associated with the received information. This may include any parameters or attributes of the radar device 130 not provided in Step 205. The RPAC computer device 110 can retrieve 210 the needed radar device parameters from a database 120 (shown in FIG. 1). The RPAC computer device 110 can also retrieve 210 the needed radar device parameters from one or more information source computer devices 125 (shown in FIG. 1).

In some embodiments, the radar device 130 is mobile, such as an aircraft. In these embodiments, the RPAC computing device 110 retrieves 215 a plurality of travel parameters for the identified radar device 130. The plurality of travel parameters include vehicle type, waypoints and times, heading, direction, speed, and satellite orbital parameters. The plurality of travel parameters may be provided via a user interface, uploaded in a file, stored in the database 120, or provided from one or more information source computer devices 125. The geographic data for the radar device is based on the starting location of the radar device 130 and the plurality of travel parameters.

The RPAC computer device 110 receives 220 a geographic location for the radar device 130. The geographic location includes location information that may be provided via a user interface, uploaded in a file, or stored in the database 120. The geographic location can be provided with the received information or can be stored in a databased, such as in the case of a satellite with a known orbit. The location information can includes, but is not limited to, a starting location or permanent location of the radar device 130, direction and speed of travel of a mobile radar device 130, and/or one or more nodes that a mobile radar device 130 will travel to.

The RPAC computer device 110 retrieves 225 geographic data about a geographic region associated with the geographic location of the radar device 130. If the radar device 130 is mobile, then the RPAC computer device 110 retrieves 215 geographic data for the planned route of the radar device 130. The geographic data can be retrieved 215 from one or more information source computer devices 125. The geographic data of the geographic region includes information about the surroundings of the radar device 130 and includes both natural and manmade terrain, such as mountains and high power lines.

The RPAC computer device 110 retrieves 230 weather information associated with the geographic location based on the location information provided. The weather information can include a current forecast for the location or locations provided. The weather information can also include future weather forecasts based on a planned mission, such as performing a search and rescue mission later the same day. The weather information can also include historical weather information for the location provided, such as to determine how the radar device 130 would function in the different conditions that occur at that location.

When the RPAC computer device 110 receives or retrieves data from a client device 105, a database 120, or an information source computer device 125, the RPAC computer device 110 confirms that the data is in the proper format for use in the formulas and calculations described herein. The RPAC computer device 110 converts any data that needs to be converted prior to using in the formulas and calculations described herein. For example, if the altitude information is provided in feet or miles, the RPAC computer device 110 converts the altitude information into meters for use in the formula. The RPAC computer device 110 can also convert the results into other units depending on the user preferences.

The RPAC computer device 110 computes (e.g. calculates) 235 measures of performance for the radar device 130. The measures of performance are based on the plurality of parameters, the geographic data, the plurality of travel parameters, and the weather information. The measures of performance can include signal strength, the received operating characteristic (ROC) curve, and quality of service (QoS) measurements. In situations where no target information is provided, then the measures of performance are calculated and provided to the user via the client device 105. In these situations, the measures of performance are transmitted to the client device 105. In the case of a web service, the RPAC computer device 110 displays the measures of performance on the website page, which is transmitted to the client device 105 to be displayed to the user. The measures of performance can include maps displaying areas of coverage of the radar device 130, which may be modified based on signal strength.

The RPAC computer device 110 can also receive 240 target information. The target information can include identifying information about the target and location information for the target. The identifying information about the target may vary from a make and model the target vehicle, such as from a pull-down list on the website, to a type of target to be detected (vehicle, individual, etc.), to a plurality of the operating parameters of the target to be detected.

The RPAC computer device 110 retrieves 245 a plurality of target parameters for the identified target based on the target information. This may include any parameters and attributes not provided in Step 230. The RPAC computer device 110 can retrieve 235 the needed target parameters from database 120. The RPAC computer device 110 can also retrieve 235 the needed target parameters from one or more information source computer devices 125. For example, if the target is a life raft, the RPAC computer device 110 can retrieve 235 size and radar profile information about the life raft, such as if the life raft includes a radar transmitter to assist in locating it and what are the parameters of the radar transmitter. The RPAC computer device 110 can also retrieve geographic data and weather information for the target.

If the target is mobile, such as an aircraft, the RPAC computer device 110 retrieves 250 a plurality of travel parameters for the target. The RPAC computer device 110 can also retrieve geographic data and weather information for the locations that the target is expected to travel through.

The RPAC computer device 110 computes 2550 the probability of detection of the target based on the plurality of parameters of the radar device 130, the plurality of target parameters, the geographic data, the weather information, the plurality of travel parameters of the radar device 130, the plurality of travel parameters for the target, and the measures of performance. The RPAC computer device 110 transmits the probability of detection of the target to the client device 105, such as through the web page. The probability of detection could be a percentage or if the probability exceeds a threshold.

The steps of process 200 can be rearranged. For example, receiving 240 target information and retrieving 240 a plurality of target parameters can be moved to before Step 215. Furthermore, the steps of process 200 can be rearranged based on how and when information is provided by the user.

Figure 3:
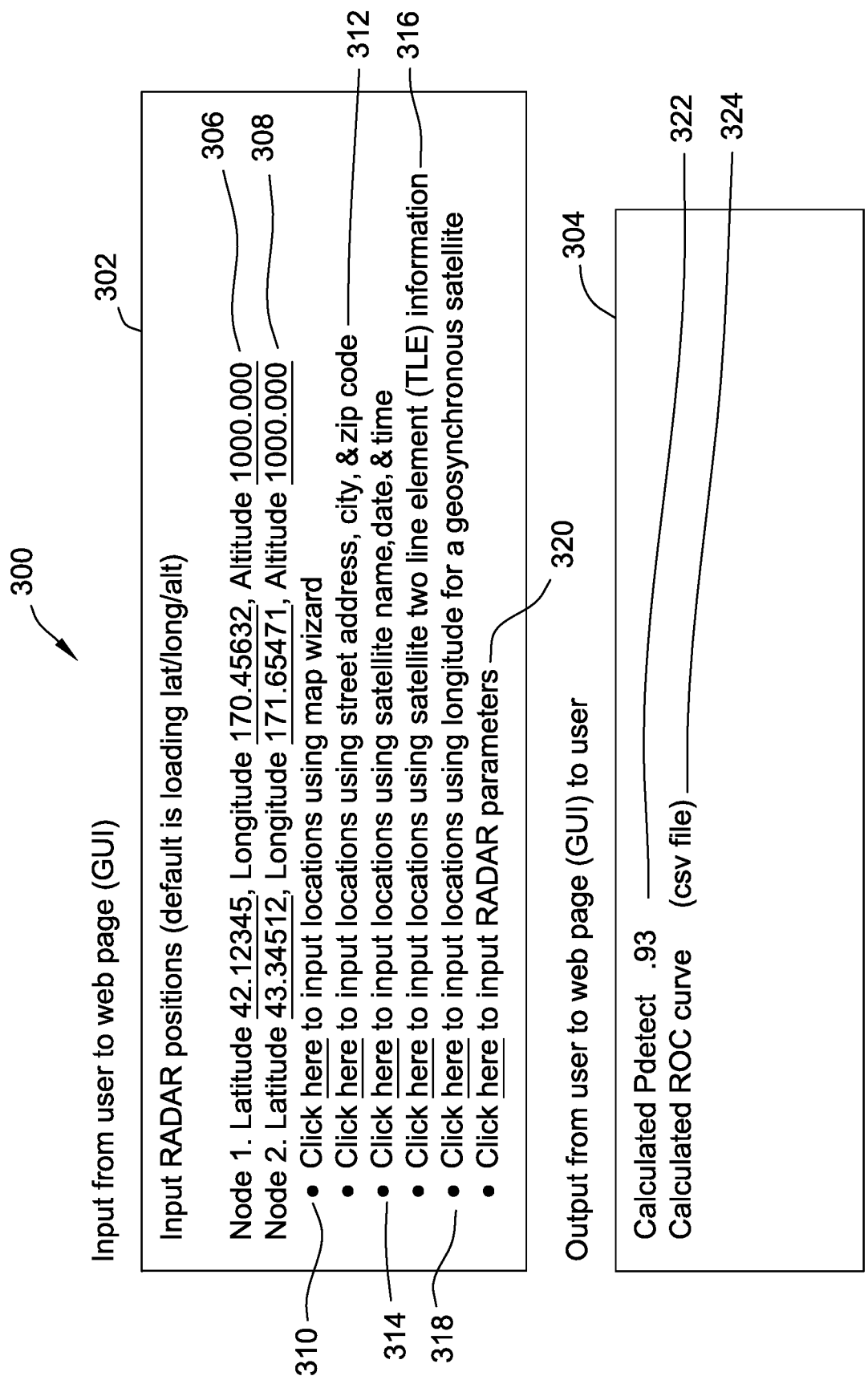
FIG. 3 illustrates an example graphical user interface for providing and receiving information about a radar device shown in FIG. 1.

FIG. 3 illustrates an example graphical user interface 300 for providing and receiving information about the radar device 130 (shown in FIG. 1). Graphical user interface 300 can be displayed on client device 105 (shown in FIG. 1). Graphical user interface 300 can be displayed on a web page provided by RPAC computer device 110 (shown in FIG. 1). Graphical user interface 300 includes an input section 302 and an output section 304.

The input section 302 includes input fields 306 and 308 that allow the user to input radar location information, such as latitude, longitude, and altitude for the radar device 130. Graphical user interface 300 also includes options to provide locations using map wizard information, street address information, and satellite information. At 310, the user may select a link to input locations using map wizard. At 312, the user may select a link to input locations using street address, city, and zip code. At 314, the user may select a link to input locations using satellite name, date, and time. At 316, the user may select a link to input locations using satellite two line element (TLE) information. At 318, the user may select a link to input locations using longitude for a geosynchronous satellite. At 320, user may select a link to input radar parameters.

The output section 304 displays output from the analysis of the radar device 130. The output includes the probability to detect 322 a target and a received operating characteristic (ROC) curve 324. The ROC curve 324 can be provided in a file, such as a comma-separated values (.csv) file.

Other inputs may be available. For example, input section 302 can also include information about the target to be detected. Input section 302 can also include information about the movement of a mobile radar device 130 and/or a mobile target. The input section 302 can provide a location where a user may input radio parameters. Other inputs may also be provided. Thus, the illustrative examples shown in FIG. 3 are not necessarily limiting of the claimed disclosure.

While satellites may use two line element (TLE) information, other formats may promote RPAC computer device 110 to calculate locations and radar signal strength over time for any vehicle or other moving object that may follow a predictable and calculable trajectory. Such vehicles include satellites and other airborne vehicles, but may also include, for example, a truck on an interstate highway, a railroad train on a track, or an unmanned aerial vehicle (UAV) drone.

FIG. 4 illustrates another example graphical user interface 400 for providing and receiving information about the radar device 130 (shown in FIG. 1). Graphical user interface 400 depicts a display that a user at client device 105 may view when submitting information to RPAC computer device 110. User may enter information about one or more radar devices 130 and potential interference sources. As with the input section 302 of graphical user interface 300 (both shown in FIG. 3), user may be provided fields to enter data, but such information may be automatically provided by other sources, such as database 120 and information source computer devices 125 (both shown in FIG. 1), in other illustrative embodiments. In graphical user interface 400, a user may enter data about at least one of radar device 1 130, radar device 2 130, and jammer 1. The user may enter data in categories depicted in graphical user interface 400 including frequency for radar 402, radio frequency (RF) bandwidth of radars 404, gain of antenna for radars 406, transmit power for radars 408, and modulation for radars 410.

Each category contains several selections, several of which are labeled and enumerated herein for discussion purposes in graphical user interface 400. For example, frequency for radars 402 provides a selection for frequency of jammer 1 412 and bandwidth of radars 404 provides a selection for RF bandwidth of radar 2 414. In other examples, gain of antenna for radars 406 provides a selection for gain of antenna for radar 1 416. In another example, transmit power for radars 408 provides a selection for transmit power for radar 1 418. In another example, modulation for radars 410 provides a selection for modulation for radar 1 420. Data entered into fields in user communications interface depicted in graphical user interface 400 can be used by RPAC computer device 110 to determine prediction of measure of radar performance.

FIGS. 3 and 4 illustrate example graphical user interfaces 300 and 400. In other user interfaces, the RPAC system 100 (shown in FIG. 1) allows the user to select radar type, radar location, target location, target information, information about blockages or occlusions, and weather information.

The radar type could be selected by manufacturer, preferred nomenclature, such as military nomenclature, or purpose, such as air traffic control, maritime tracking, etc. The radar type could be presented to the user as a pull-down list with a plurality of selectable options. The radar type could also be entered via parameters, such as for a custom or prototype radar device. In this case, a table of parameters could be filled out by the user to describe the radar device 110. The parameters of the radar device 130 can be provided by the user or looked up from one or more databases 120 and/or information source computer devices 125. The radar parameters could include, but are not limited to, radar antenna pattern of radar (azimuths and elevations), radar beam characteristics (transmitter frequency, transmitter power, receiver frequency, receiver minimum power, range product, frame time, azimuth field of view, elevation field of view, range accuracy, azimuth accuracy, operating frequency, antenna type, peak power output, pulse width, pulse repetition rate, antenna rotation, antenna shape & size, gain, beam width, cross-polarization isolation, nominal $R_{max}$, range resolution, range oversampling, RF receiver gain, transmitted wavelength, peak transmitted power, antenna efficiency, transmitted pulse length, pulse repetition frequency, number of coherent averages, first calibration coefficient, and second calibration coefficient.

The radar location would depend on whether the radar device 110 was stationary or mobile. If stationary, then the user could enter latitude, longitude, and altitude, global positioning system (GPS) coordinates, such as in the WGS-84 format, street address and height of antenna, or military grid reference system (MGRS) coordinates. If the radar device 110 is mobile, the user can enter the vehicle type, such as, but not limited to, drone with waypoints, aircraft, ground craft, watercraft, spacecraft, and satellite. This can be selected from a pull-down. For the drone, the user can enter the waypoints and times, such as through a table of locations, attitudes, and corresponding times. The user can also input heading including direction, speed, altitude/elevation, and time. For satellites, the user can either select a satellite from a pull down list or provide the satellite's orbital parameters. For example, the RPAC computer device 110 can receive the following data fields for the location of the radar device 130: start time, start position, start altitude, speed, heading, waypoint 1 (time, position, altitude), waypoint 2 (time, position, altitude), and waypoint 3 (time, position, altitude). If the radar device 130 is stationary, then only the first three fields are used.

The target location would depend on whether the target was stationary or mobile. If stationary, then the user could enter latitude, longitude, and altitude, global positioning system (GPS) coordinates, such as in the WGS-84 format, street address and height of antenna, or military grid reference system (MGRS) coordinates. If the target is mobile, the user can enter the vehicle type, such as, but not limited to, drone with waypoints, aircraft, ground craft, watercraft, spacecraft, and satellite. This can be selected from a pull-down. For the drone, the user can enter the waypoints and times, such as through a table of locations, attitudes, and corresponding times. The user can also input heading including direction, speed, altitude/elevation, and time. For satellites, the user can either select a satellite from a pull down list or provide the satellite's orbital parameters. For example, the RPAC computer device 110 can receive the following data fields for the location of the target: start time, start position, start altitude, speed, heading, waypoint 1 (time, position, altitude), waypoint 2 (time, position, altitude), waypoint 3 (time, position, altitude). If the target is stationary, then only the first three fields are used.

The target information could be a radar cross section (RCS) area of the target, which could include a table of dimensions of the target or an explicit RCS. The target information could also include any stealth parameters of the target, as well as other parameters of the target. The target information could also include information about the electronic warfare capabilities of the target. These can include jamming or interference parameters and defensive countermeasures. This information can be optional. The RPAC system 100 can default the RCS area of the target to one square meter.

The RPAC system 100 can retrieve blockage and occlusion information from information source computer devices 125. The RPAC system 100 can also receive blockage and occlusion information from the user. Natural terrain data can be provided by information source computer devices 125, such as, Digital Terrain Elevation Data (DTED). The user can also provide terrain blockage parameters. Manmade terrain data can be provided by information source computer devices 125, which can allow access to one or more databases, which the user can select from a pull-down and that provide locations of buildings and other manmade objects. The user can also provide manmade building parameters.

The RPAC system 100 can receive weather information, such as rain, fog, dust, and sea state, from information source computer devices 125 that can provide current conditions based on the location information of the radar device 130 and the target. The user can also select a future date and time which cause the RPAC computer device 110 to determine and use the forecast for that future time and date. The user can also enter weather parameters.

Figure 5:
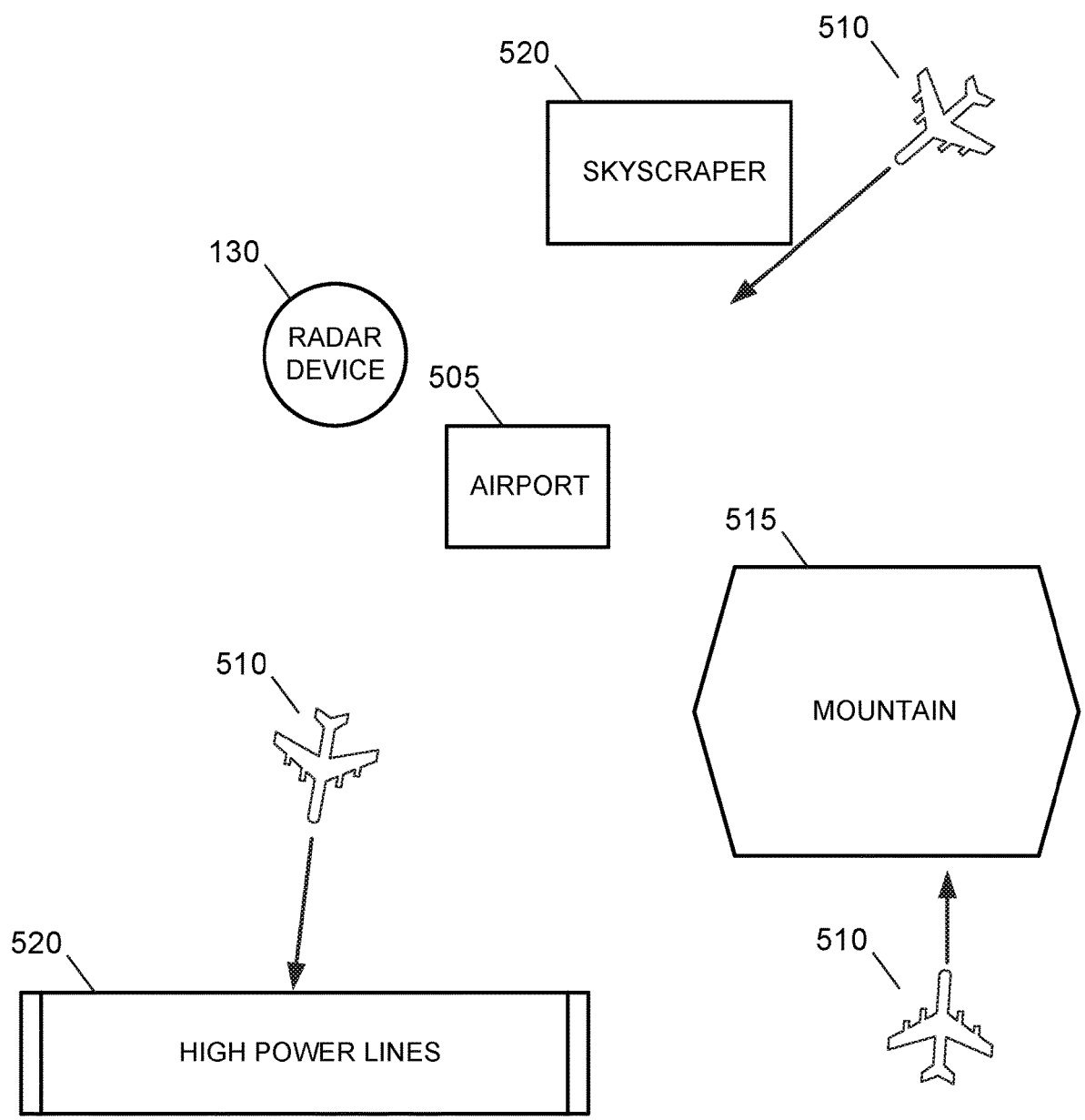
FIG. 5 illustrates a block diagram of an airport with a radar device whose performance can be computed using the RPAC system shown in FIG. 1.

FIG. 5 illustrates a block diagram 500 of an airport 505 with a radar device 130 whose performance can be computed using the RPAC system 100 (shown in FIG. 1). Diagram 500 includes a plurality of aircraft, which would be considered targets (e.g. airplanes) 510 to be detected by the radar device 130. The diagram also includes natural terrain 515 (e.g. a mountain or trees) and manmade terrain 520 (e.g. a skyscraper, high power lines, or similar structures). The RPAC computer device 110 (shown in FIG. 1) computes the performance of the radar device 130 using process 200 (shown in FIG. 2). The RPAC computer device 110 receives the location and parameters of the radar device 130, the location and parameters associated with the natural terrain 515, the manmade terrain 520, and the targets 510 to be detected. If the radar device 130 is in a planning stage, the location of the radar device 130 can be changed to improve the measures of performance for the radar device 130. The parameters and/or design of the radar device 130 can also be changed to improve the measures of performance.

The radar device 130 can be in communication with a client device 105 (shown in FIG. 1) that can provide changes to the operating parameters of the radar device 130. For example, if the weather changes so that the probability of detection or measures of performance go below a predetermined threshold, the RPAC computer device 110 can instruct the client device 105 to change the operating parameters of the radar device 130 so that the probability of detection and/or the measures of performance are returned to above the predetermined threshold.

FIG. 6 illustrates an example data file 600 providing information about the radar device 130 from the client device 105 to the RPAC computer device 110 (all shown in FIG. 1). The RPAC computer device 110 provides the capability to receive input from data file 600 in Extensible Markup Language (XML) format. FIG. 6 provides a depiction of data file 600 in Extensible Markup Language (XML) format and can be an Extensible Markup Language (XML) computer-to-computer file. The data file 600 would be submitted to client device 105 from user. The client device 105 transmits the data file 600 to the RPAC computer device 110 for analysis and computation of the performance of the radar device 130 described in the data file 600. The RPAC computer device 110 provides its output to the user at client device 105. What is presented in FIG. 6 is a representation of the data file 600 and may not be exactly what a user may visually see when situated in front of client device 105. If the user were to cause client device 105 to present a view of the data file 600, it might not appear exactly as presented in FIG. 6. Further, what appears to be a heading atop the box in the data file 600 might not appear to the user and are depicted in FIG. 6 for discussion purposes.

The user of client device 105 in submitting a request to RPAC computer device 110 would provide a data file 600 in Extensible Markup Language (XML) format such as is depicted in FIG. 6. The RPAC computer device 110 would recognize that the data file 600 is in Extensible Markup Language (XML) format and would process the data file 600 accordingly.

The group of bracketed entries indicated by reference numeral 602 provides locations of five nodes where are located five radar devices 130. The group of bracketed entries indicated by reference numeral 604 provides frequencies of the five radar devices 130. Reference numeral 606 describes a frequency of jammer. The group of bracketed entries indicated by reference numeral 608 provides bandwidth of the five radar devices 130. The entry indicated by reference numeral 610 describes a bandwidth of jammer. The group of bracketed entries indicated by reference numeral 612 provides gain of antenna of the five radar devices 130. Reference numeral 614 describes a gain of antenna for jammer. The group of bracketed entries indicated by reference numeral 616 provides transmit power for the five radar devices 130. Reference numeral 618 describes transmit power for jammer. Reference numeral 620 describes modulation for the first radar device 130 and reference numeral 622 describes modulation for jammer.

Figure 7:
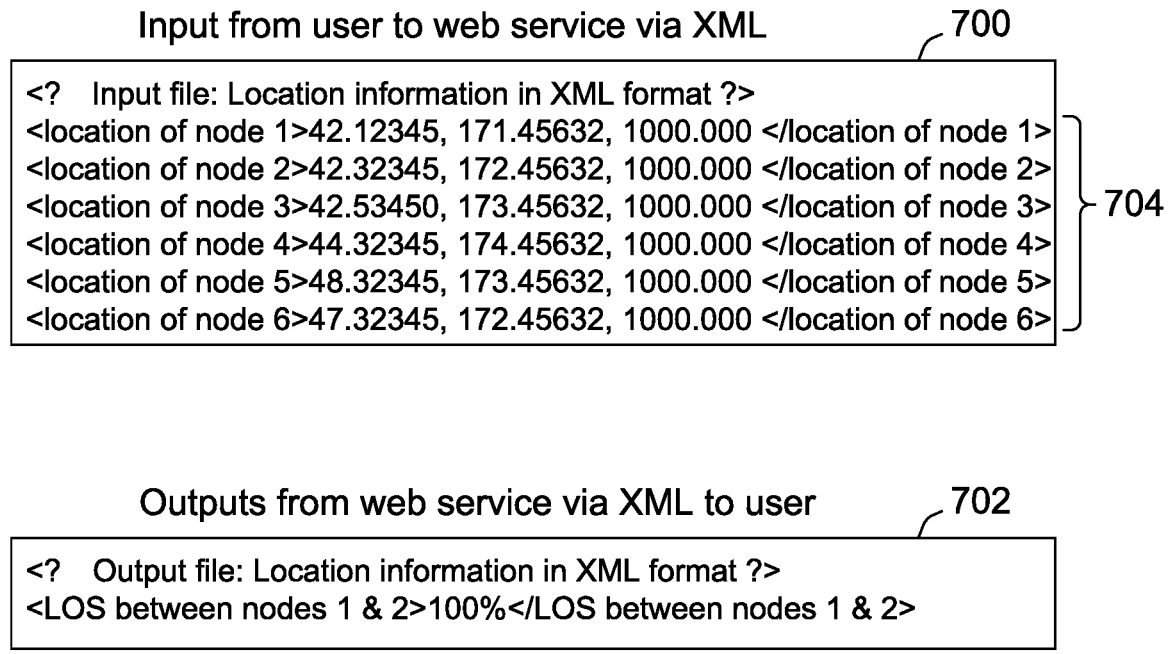
FIG. 7 illustrates an example input data file providing information about the radar device from the client device to the RPAC computer device and an example output data file with the results of the performance analysis.

FIG. 7 illustrates an example input data file 700 providing information about the radar device 130 from the client device 105 to the RPAC computer device 110 (all shown in FIG. 1) and an example output data file 702 with the results of the performance analysis. Input data file 700 and output data file 702 are provided in Extensible Markup Language (XML) format. Similar to FIG. 6, what is presented in FIG. 6 is a representation of the data files 600 (shown in FIG. 6), input data file 700, or output data file 702 and may not be exactly what a user may visually see when situated in front of client device 105. If the user were to cause client device 105 to present a view of the data files 600, input data file 700, or output data file 702, they may not appear exactly as presented in FIG. 7. Further, what appears to be a heading atop the boxes in which the input data file 700 and output data file 702 appear might not appear to the user and are depicted in FIG. 7 for discussion purposes.

The user of client device 105 in submitting a request to the RPAC computer device 110 would provide input data file 700 in Extensible Markup Language (XML) format. The group of bracketed entries indicated by reference numeral 704 provides locations of five nodes where are located five radar devices 130. RPAC computer device 110 would recognize that the input data file 700 is in Extensible Markup Language (XML) format and would process the input data file 700 as described herein. RPAC computer device 110 provides output to client device 105 as depicted in output data file 702 indicated at reference numeral 706. In the example of FIG. 7, output provided is for a measurement of line of sight between node 1 and node 2, which in the example is 100%.

Figure 8:
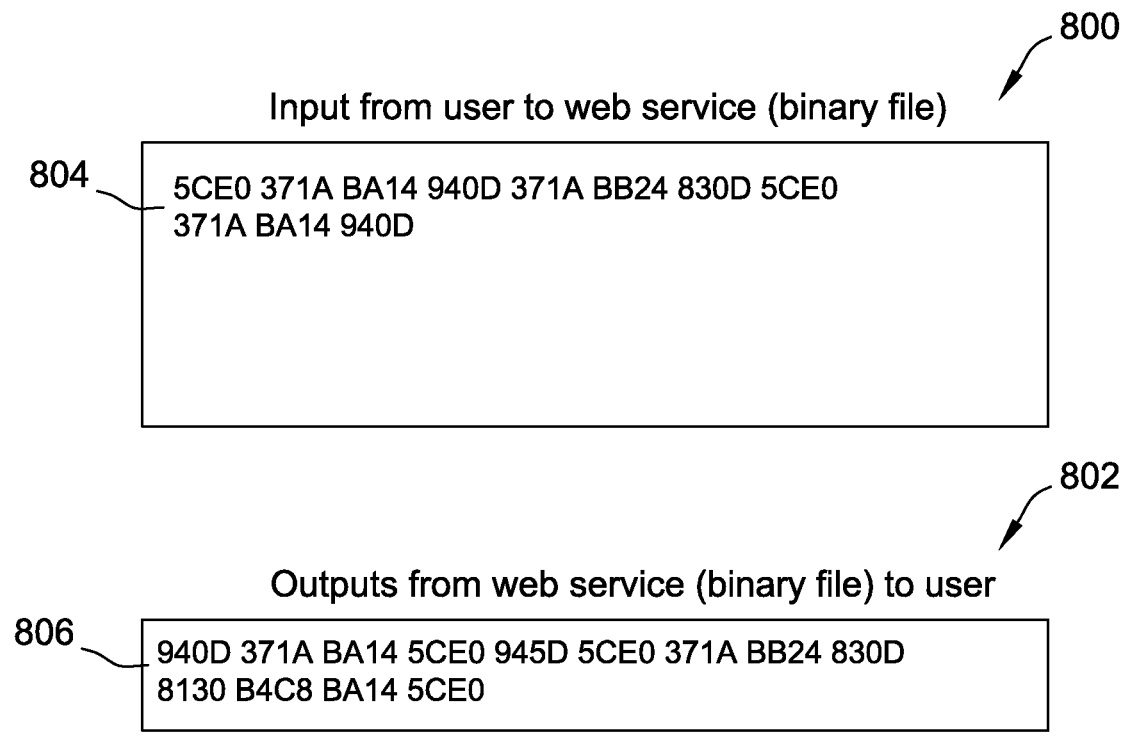
FIG. 8 illustrates another example input data file providing information about the radar device from the client device to the RPAC computer device and another example output data file with the results of the performance analysis.

FIG. 8 illustrates an example input data file 800 providing information about the radar device 130 from the client device 105 to the RPAC computer device 110 (all shown in FIG. 1) and an example output data file 802 with the results of the performance analysis. Input data file 800 and output data file 802 are provided in binary format as binary data files. Similar to FIGS. 6 and 7, what is presented in FIG. 8 is a representation of binary data files 800 and 802 and may not be exactly what a user may visually see when situated in front of client device 105. If the user were to cause client device 105 to present a view of the binary data files, they may not appear exactly as presented in FIG. 8. Further, what appears to be a heading atop the boxes in which the input data file 800 and output data file 802 appear might not appear to the user and are depicted in FIG. 8 for discussion purposes.

In the input data file 800 there appears a first string a binary data, reference number 804. The first string of binary data 804 represents location information for at least one radar device 130. The user of client device 105 provides the first string of binary data in the input data file 800 to RPAC computer device 110. RPAC computer device 110 processes the first string of binary data 804 as described herein. RPAC computer device 110 provides a prediction of measure of performance to client device 105 as a second string of binary data 806.

Figure 9:
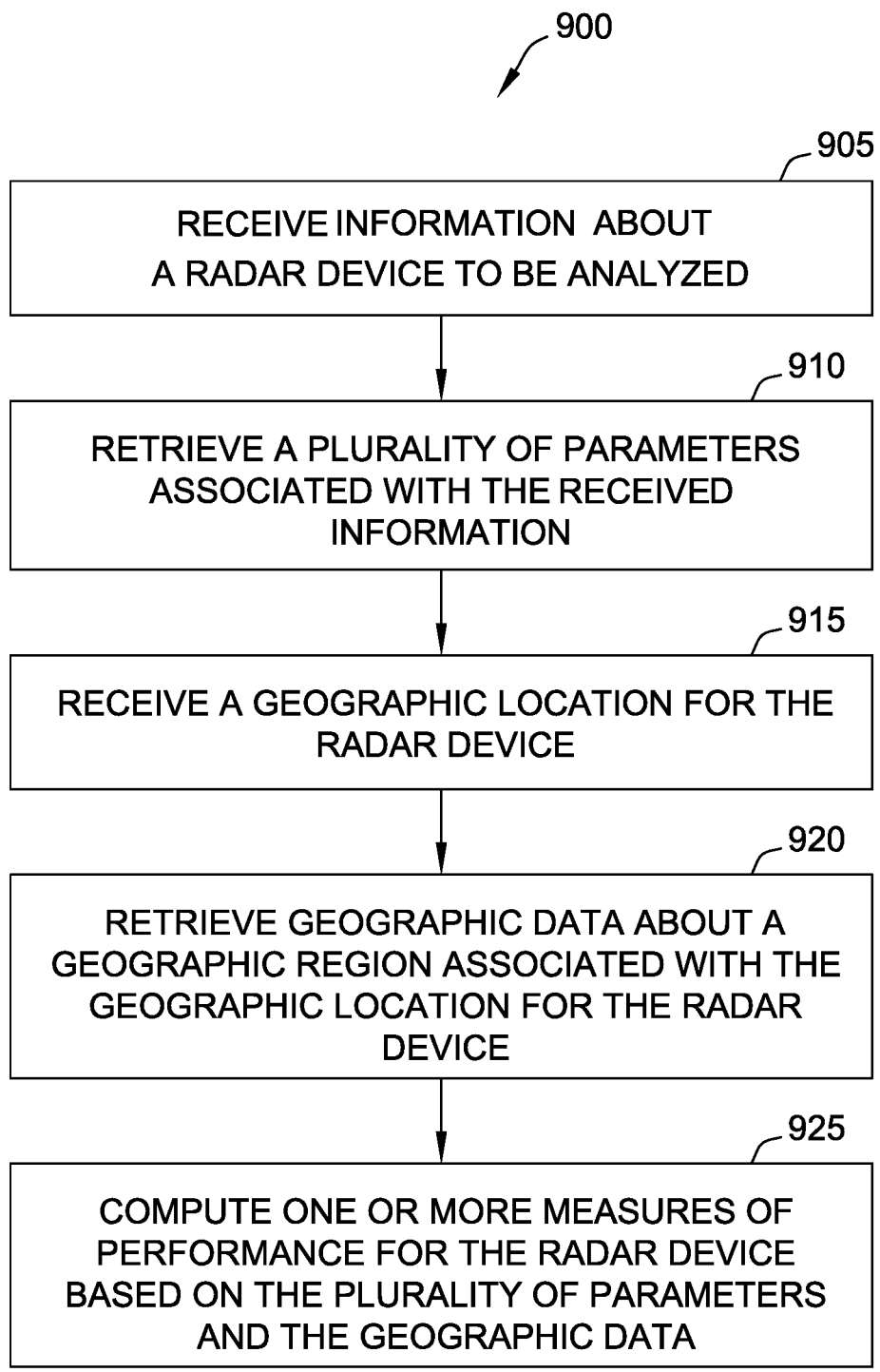
FIG. 9 illustrates a process for calculating performance of the radar device shown in FIG. 1 using a radar performance analysis calculator (RPAC) computer device.

FIG. 9 illustrates a process 900 for calculating performance of the radar device 130 (shown in FIG. 1) using a radar performance analysis calculator (RPAC) computer device 110 (shown in FIG. 1). The steps of process 900 can be performed by the RPAC computer device 110. The RPAC computer device 110 executes one or more applications to perform the steps of process 900. The RPAC computer device 110 is in communication with a client device 105 via a cloud-accessible user communications interface, where access to radar performance analysis calculator system is provided as a web service. The RPAC computer device 110 is configured to receive inputs in multiple data types comprising at least one of graphical user interface input, extensible markup language input, and binary input.

The RPAC computer device 110 receives 905 information about a radar device 130 to be analyzed. The RPAC computer device 110 receives information identifying the radar device 130 to be analyzed from a client device 105 (shown in FIG. 1). The RPAC computer device 110 can execute a web browser that provides a graphical user interface 300 (shown in FIG. 3) to the user via the user's client device 105. The RPAC computer device 110 can also receive an input data file 700 from the client device 105 with information identifying the radar device 130 to be analyzed. The RPAC computer device 110 can also receive a plurality of radar devices 130 to be analyzed. The identifying information can be selecting the radar from a pull-down of available selections or individual parameters provided by the user. For example, the user can provide the frequency, noise temperature, radar cross-section, antenna gain, noise figure, peak transmit power, and pulse width.

The RPAC computer device 110 retrieves 910 a plurality of parameters associated with the received information about the radar device 130 to be analyzed. The RPAC computer device 110 can retrieve 910 the plurality of parameters from the database 120 of radar devices 130 or from one or more information source computer devices 125. The RPAC computer device 110 can also calculate some of the values from the provided information. Calculated values can include wavelength, bandwidth, and signal to noise ratio (SNR). The RPAC computer device 110 uses the following radar equation:

$$R_{max} = \left( \frac{P_t G^2 \lambda^2 \sigma \; n \; E_j(n)}{(4\pi)^2 k T_e B F_n \left(\frac{S}{N}\right) L_f(n_g)} \right) \quad \text{Equation 1}$$

where $R_{max}$ is the range from the transmitter to the target, $P_t$ is the peak transmit power in watts, G is the gain of the antenna, $\lambda$ is the radar operating frequency wavelength in meters, $\sigma$ is the target's non-fluctuating radar cross section in square meters, k is the constant $1.38e^{-23}$, $T_e$ is the noise temperature, B is the bandwidth, F is the noise figure, n is the number of pulses, and E is the integration improvement pulses. The plurality of parameters can be divided into two groups. The first group includes parameters with specific values that are provided by the user and/or the database. The second group includes parameters that need to be computed. The RPAC computer device 110 computes the values of the four needed parameters. The first parameter is wavelength, which is calculated using Equation 2 below.

$$\text{Wavelength} = c/fo \quad \text{Equation 2}$$

where c is the speed of light (300,000 meters per second) and fo is the frequency of operation.

The second parameter is bandwidth, which is calculated as:

$$\text{Bandwidth} = 1/(\text{pulse width}) \quad \text{Equation 3}$$

The third parameter is the SNR (signal to noise ration), which is calculated as:

$$SNR = \frac{P_{av} T_i G^2 \lambda^2 \sigma}{(4\pi)^3 R^4 k T_e F L} \quad \text{Equation 4}$$

where Pay is average power, L is radar losses, F is the noise figure, R is the range from the transmitter to the target, and $T_i$ is the time on target.

The fourth parameter is integration improvement, which is calculated as:

$$[I(n_p)]_{dB} = 6.79(1 + 0.235 P_D)\left(1 + \frac{P_{fa}}{46.6}\right) \quad \text{Equation 5}$$
$$\log(1 - 0.140 \log (n_p) + 0.018310(\log n_p)^2)$$

where I is improvement, $P_D$ is the probability of detection, $P_{fa}$ is the probability of false alarm, and $n_p$ is the number of pulses.

The RPAC computer device 110 receives 915 a geographic location for the radar device 130. The geographic location can be latitude, longitude, altitude, GPS coordinates, a street address, MGRS, satellite two line element information, and geosynchronous satellite longitude. If the radar device 130 is mobile, then the geographic location is the starting location and the RPAC computer device 110 receives a plurality of travel parameters for the radar device 130. The travel parameters include vehicle type, waypoints and times, heading, direction, speed, and satellite orbital parameters.

The RPAC computer device 110 retrieves 920 geographic data about the geographic region associated with the geographic location for the radar device 130. The RPAC computer device 110 can retrieve 920 the geographic data from one or more databases 120 and/or one or more information source computer devices 125. If the radar device 130 is mobile, then the RPAC computer device 110 determines the geographic data for the radar device 130 based on the starting location and the plurality of travel parameters.

When the RPAC computer device 110 receives or retrieves data from a client device 105, a database 120, or an information source computer device 125, the RPAC computer device 110 confirms that the data is in the proper format for use in the formulas and calculations described herein. The RPAC computer device 110 converts any data that needs to be converted prior to using in the formulas and calculations described herein. For example, if the altitude information is provided in feet or miles, the RPAC computer device 110 converts the altitude information into meters for use in the formula. The RPAC computer device 110 can also convert the results into other units depending on the user preferences.

The RPAC computer device 110 computes 925 one or more measures of performance for the radar device based on the plurality of parameters and the geographic data. The measures of performance can include one or more of probability of detection, quality of service, and receiver operating characteristic curve.

As shown in process 200 (shown in FIG. 2), the RPAC computer device 110 can also receive target information for a target to be detected, such as target 510 (shown in FIG. 1). The RPAC computer device 110 also receives a target location. If the target 510 is mobile, then the RPAC computer device 110 receives a plurality of travel parameters for the target including the starting location and a plurality of travel parameters, such as, but not limited to, vehicle type, waypoints and times, heading, direction, speed, and satellite orbital parameters. The RPAC computer device 110 receives a plurality of target parameters associated with the target 510 to be detected. The plurality of target parameters can include, but is not limited to, radar cross section area of the target 510, stealth parameters of the target, jamming/interference parameters, countermeasure parameters, and other parameters.

The RPAC computer device 110 determines target geographic data associated with the target 510 to be detected based on the target location. If the target 510 is mobile, the RPAC computer device 110 determines target geographic data based on the starting location and the plurality of travel parameters.

The RPAC computer device 110 computes a probability of detection of the target 510 to be detected based on the plurality of parameters of the radar device 130, the geographic data associated with the radar device 130, the target geographic data, and the plurality of target parameters. If the RPAC computer device 110 knows the location of the radar device 130 and the target 510, then the RPAC computer device 110 looks up the altitudes of those points in one or more terrain databases to determine if there are any obstructions, such as mountains in between those two points. The RPAC computer device 110 can also calculate if the curvature of the Earth gets in the way between the radar wave between the radar device 130 and the target 510. Buildings, towers, and other manmade structures can block radar waves. The RPAC computer device 110 can use urban databases, such as those provided by information source computer devices 125, to calculate if a radar wave would be blocked between the radar device 130 and the target 510. The RPAC computer device 110 detects one or more terrain obstacles, such as mountains or buildings, based on the geographic data. The RPAC computer device 110 calculates radar effects for the one or more terrain obstacles.

The RPAC computer device 110 can retrieve weather information associated with the geographic region, such as from an information source computer device 125. The RPAC computer device 110 can compute one or more measures of performance for the radar device 130 based on the plurality of parameters, the geographic data, and the weather information. The RPAC computer device 110 uses the weather information to calculate the amount of water in the air, which can affect different radar frequencies differently.

Figure 10:
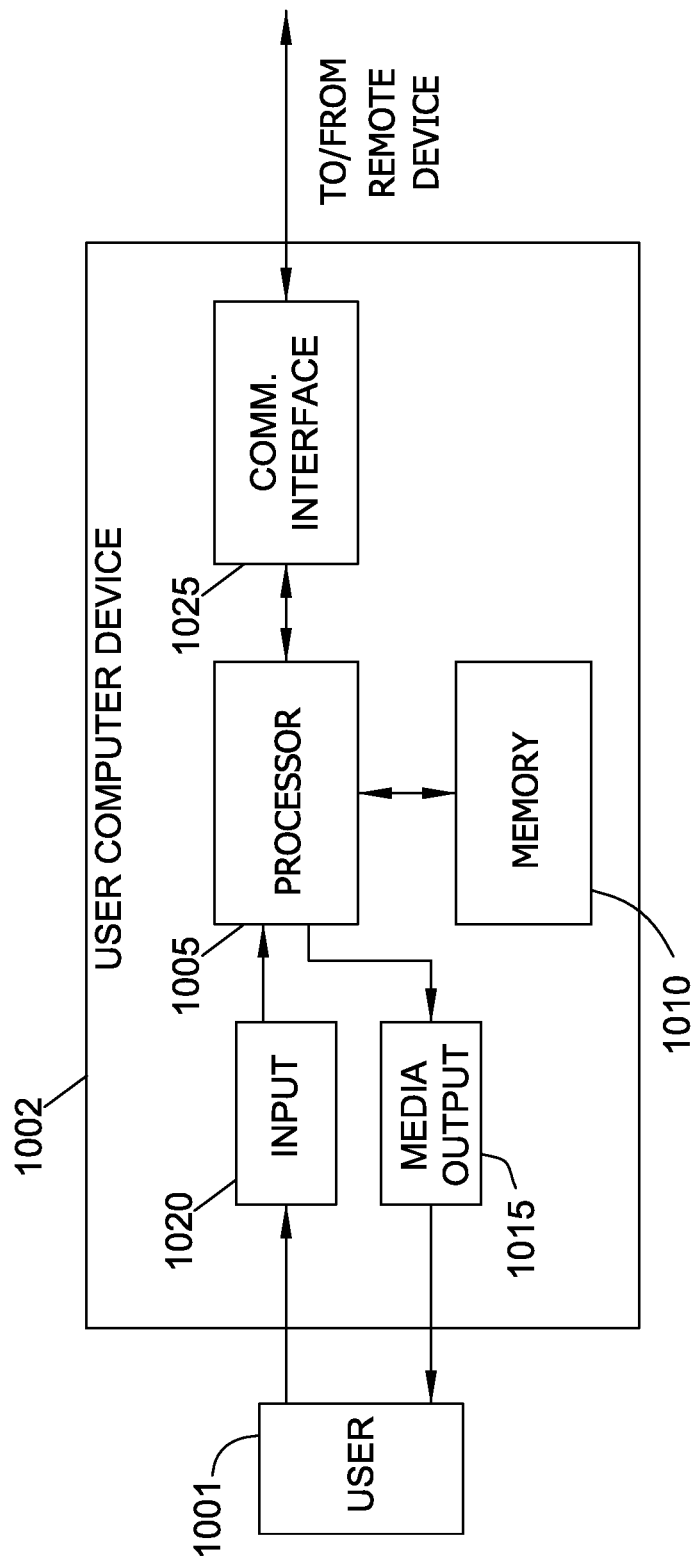
FIG. 10 illustrates an example configuration of a user computer device used in the system shown in FIG. 1, in accordance with one example of the present disclosure

FIG. 10 illustrates an example configuration of a user computer device 1002 used in the RPAC system 100 (shown in FIG. 1), in accordance with one example of the present disclosure. User computer device 1002 is operated by a user 1001. The user computer device 1002 can include, but is not limited to, the client device 105, information source computer device 125, and the radar device 130 (all shown in FIG. 1). The user computer device 1002 includes a processor 1005 for executing instructions. In some examples, executable instructions are stored in a memory area 1010. The processor 1005 can include one or more processing units (e.g., in a multi-core configuration). The memory area 1010 is any device allowing information such as executable instructions and/or transaction data to be stored and retrieved. The memory area 1010 can include one or more computer-readable media.

The user computer device 1002 also includes at least one media output component 1015 for presenting information to the user 1001. The media output component 1015 is any component capable of conveying information to the user 1001. In some examples, the media output component 1015 includes an output adapter (not shown) such as a video adapter and/or an audio adapter. An output adapter is operatively coupled to the processor 1005 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1015 is configured to present a graphical user interface (e.g., a web browser and/or a client application) to the user 1001. A graphical user interface can include, for example, an interface for viewing the performance information about a radar device 130. In some examples, the user computer device 1002 includes an input device 1020 for receiving input from the user 1001. The user 1001 can use the input device 1020 to, without limitation, select a radar device 130 to analyze. The input device 1020 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1015 and the input device 1020.

The user computer device 1002 can also include a communication interface 1025, communicatively coupled to a remote device such as the radar performance analysis calculator computer device 110 (shown in FIG. 1). The communication interface 1025 can include, for example, a wired or wireless network adapter and/or a wireless data transceiver for use with a mobile telecommunications network.

Stored in the memory area 1010 are, for example, computer-readable instructions for providing a user interface to the user 1001 via the media output component 1015 and, optionally, receiving and processing input from the input device 1020. A user interface can include, among other possibilities, a web browser and/or a client application. Web browsers enable users, such as the user 1001, to display and interact with media and other information typically embedded on a web page or a website from the radar performance analysis calculator computer device 110. A client application allows the user 1001 to interact with, for example, the radar performance analysis calculator computer device 110. For example, instructions can be stored by a cloud service, and the output of the execution of the instructions sent to the media output component 1015.

The processor 1005 executes computer-executable instructions for implementing aspects of the disclosure.

Figure 11:
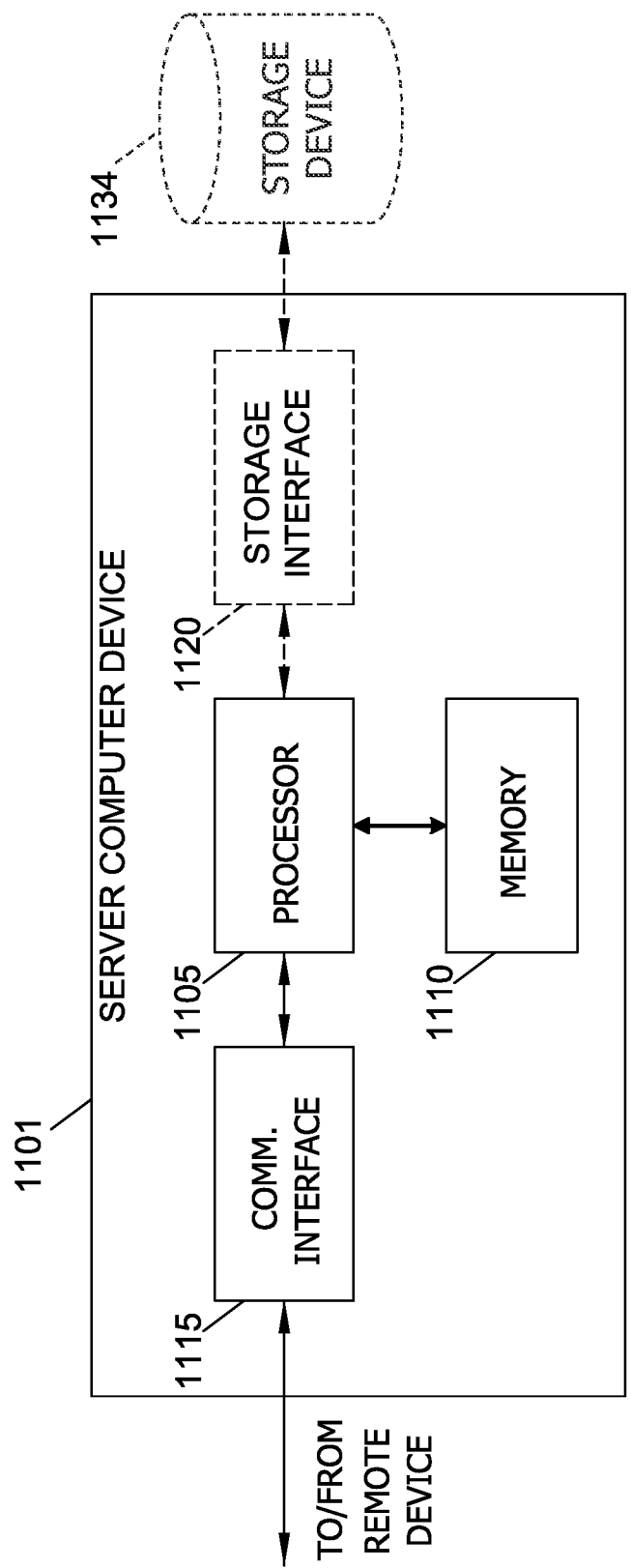
FIG. 11 illustrates an example configuration of a server computer device used in the system shown in FIG. 1, in accordance with one example of the present disclosure.

FIG. 11 illustrates an example configuration of a server computer device 1101 used in the RPAC system 100 (shown in FIG. 1), in accordance with one example of the present disclosure. Server computer device 1101 can include, but is not limited to, the radar performance analysis calculator computer device 110, information source computer device 125, and the database server 115 (all shown in FIG. 1). The server computer device 1101 also includes a processor 1105 for executing instructions. Instructions can be stored in a memory area 1110. The processor 1105 can include one or more processing units (e.g., in a multi-core configuration).

The processor 1105 is operatively coupled to a communication interface 1115 such that the server computer device 1101 is capable of communicating with a remote device such as another server computer device 1101, another radar performance analysis calculator computer device 110, or the client device 105 (shown in FIG. 1). For example, the communication interface 1115 can receive requests from the client device 105 via the Internet, as illustrated in FIG. 1.

The processor 1105 can also be operatively coupled to a storage device 1134. The storage device 1134 is any computer-operated hardware suitable for storing and/or retrieving data, such as, but not limited to, data associated with the database 120 (shown in FIG. 1). In some examples, the storage device 1134 is integrated in the server computer device 1101. For example, the server computer device 1101 can include one or more hard disk drives as the storage device 1134. In other examples, the storage device 1134 is external to the server computer device 1101 and can be accessed by a plurality of server computer devices 1101. For example, the storage device 1134 can include a storage area network (SAN), a network attached storage (NAS) system, and/or multiple storage units such as hard disks and/or solid state disks in a redundant array of inexpensive disks (RAID) configuration.

In some examples, the processor 1105 is operatively coupled to the storage device 1134 via a storage interface 1120. The storage interface 1120 is any component capable of providing the processor 1105 with access to the storage device 1134. The storage interface 1120 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1105 with access to the storage device 1134.

The processor 1105 executes computer-executable instructions for implementing aspects of the disclosure. In some examples, the processor 1105 is transformed into a special purpose microprocessor by executing computer-executable instructions or by otherwise being programmed. For example, the processor 1105 is programmed with instructions such as those shown in FIGS. 2 and 9.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in processing radar performance analysis, (ii) reduced need for significant processing elements for remote systems accessing radar performance analysis; (iii) inclusion of all applicable data in radar performance analysis; (iv) up-to-date analysis of radar performance; (v) reduced cost in analysis of radar performance; and (vi) accurate integration of information from multiple separate data stores.

The methods and systems described herein may be implemented using computer programming or engineering techniques including computer software, firmware, hardware, or any combination or subset thereof, wherein the technical effects may be achieved by performing at least one of the following steps: a) receive information about a radar device to be analyzed, wherein the server computer device is in communication with a client computer device via a cloud-accessible user communications interface, wherein radar performance analysis calculator system is provided as a web service; b) retrieve a plurality of parameters associated with the radar device to be analyzed; c) receive a geographic location for the radar device; d) retrieve geographic data about a geographic region associated with the geographic location for the radar device; e) compute one or more measures of performance for the radar device based on the plurality of parameters and the geographic data, wherein the one or more measures of performance of the radar device include one or more of probability of detection, quality of service, and receiver operating characteristic curve; f) receive a plurality of travel parameters for the radar device; g) determine the geographic data for the radar device based on the starting location and the plurality of travel parameters; h) compute the one or more measures of performance for the radar device based on the plurality of travel parameters and the geographic data; i) receive target information including a target location; j) retrieve a plurality of target parameters based on the target information, where the plurality of target parameters are associated with the target to be detected; k) compute a probability of detection of the target to be detected based on the plurality of parameters, the geographic data, and the plurality of target parameters; l) retrieve a plurality of travel parameters for the target; m) compute a probability of detection of the target to be detected based on the plurality of parameters, the geographic data, the plurality of travel parameters for the target, and the plurality of target parameters; n) o) retrieve weather information associated with the geographic location; p) compute one or more measures of performance for the radar device based on the plurality of parameters, the geographic data, and the weather information; q) detect one or more terrain obstacles based on the geographic data; r) calculate radar effects for the one or more terrain obstacles; and s) receive inputs in multiple data types comprising at least one of graphical user interface input, extensible markup language input, and binary input.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radar performance analysis system comprising:
a radar device configured to generate updated operating parameters for the radar device that are updated over time based on current performance of the radar device;
a client device in communication with the radar device, the client device being configured to receive, from the radar device, the updated operating parameters that are updated over time based on the current performance of the radar device;
a server computer device in communication with the client device, via a computer network, the server computer device including at least one processor in communication with at least one memory device, wherein the at least one processor is programmed to:
receive, from the client device via the computer network, radar information about the radar device to be analyzed;
retrieve a plurality of radar parameters for the radar device based on the received radar information;
receive, from the client device via the computer network, the updated operating parameters that are updated over time based on the current performance of the radar device;
receive a geographic location for the radar device;
retrieve a geographic data about a geographic region associated with the geographic location for the radar device;
compute one or more measures of performance for the radar device based on the plurality of radar parameters, the updated operating parameters, and the geographic data, wherein the one or more measures of performance include a predicted area of radar signal coverage;
receive target information for a target to be detected by the radar device;
retrieve a plurality of target parameters for the target to be detected by the radar device;
receive updated travel parameters of the target to be detected by the radar device; wherein the updated travel parameters are updated over time based on current operation of the target as the target moves along a path of travel;
compute a probability of detection of the target to be detected by the radar device based on the plurality of radar parameters, the updated operating parameters, the geographic data, the plurality of target parameters, and the updated travel parameters of the target; and
generate a graphical user interface including a map including a visualization of the predicted area of radar signal coverage and the probability of detection of the target to be detected by the radar device, wherein the predicted area of radar signal coverage is updated based on the updated operating parameters of the radar device and the updated travel parameters of the target, wherein the probability of detection of the target to be detected by the radar device is updated based on the updated operating parameters of the radar device and the updated travel parameters of the target, and wherein the map including the visualization of the predicted area of radar signal coverage and the probability of detection of the target to be detected by the radar device is updated based on the updated operating parameters of the radar device and the updated travel parameters of the target.

2. The system of claim 1, wherein the radar device is mobile, wherein the geographic location for the radar device is a starting location of the radar device, and wherein the at least one processor is further programmed to:
retrieve a plurality of travel parameters for the radar device, including geographic data for the radar device based on the starting location and the plurality of travel parameters; and
compute the one or more measures of performance for the radar device based on the plurality of travel parameters and the geographic data.

3. The system of claim 1, wherein the at least one processor is further programmed to:
retrieve weather information associated with the geographic location; and
compute one or more measures of performance for the radar device based on the plurality of radar parameters, the geographic data, and the weather information.

4. The system of claim 1, wherein the one or more measures of performance of the radar device include one or more of probability of detection, quality of service, and receiver operating characteristic curve.

5. The system of claim 1, wherein the server computer device is in communication with a client computer device via a cloud-accessible user communications interface.

6. The system of claim 5, wherein access to the radar performance analysis system is provided as a web service.

7. The system of claim 1, wherein the server computer device is configured to receive inputs in multiple data types comprising at least one of graphical user interface input, extensible markup language input, and binary input.

8. The system of claim 1, wherein the target parameters include a time to detect the target, and wherein the at least one processor is further programmed to:
determine forecast weather conditions associated with the geographic location at the time to detect the target; and
compute the probability of detection of the target to be detected by the radar device based on the plurality of radar parameters, the geographic data, the plurality of target parameters, and the forecast weather conditions.

9. The system of claim 1, wherein the at least one processor is further programmed to:
retrieve a plurality of weather information associated with the geographic location including a plurality of different weather conditions at the geographic location; and
for the plurality of different weather conditions at the geographic location, compute the probability of detection of the target to be detected by the radar device based on the plurality of radar parameters, the geographic data, the plurality of target parameters, and the plurality of different weather conditions at the geographic location.

10. The system of claim 1, wherein the at least one processor is further programmed to:
receive one or more mission parameters for a future mission to detect the target by the radar device; and
compute the probability of detection of the target to be detected by the radar device based on the plurality of radar parameters, the geographic data, the plurality of target parameters, and the one or more mission parameters.

11. The system of claim 1, wherein the one or more measures of performance for the radar device include a receiver operating characteristic curve for the radar device, and wherein the graphical user interface includes a visual representation of the receiver operating characteristic curve.

12. A method for radar performance analysis, the method is implemented by a computer device including at least one processor in communication with at least one memory device, the method comprises:
receiving radar information about a radar device to be analyzed from a client device in communication with the radar device, wherein the radar device is configured to generate updated operating parameters for the radar device that are updated over time based on current performance of the radar device, and send the updated operating parameters for the radar device to the client device as the updated operating parameters are updated over time;
retrieving a plurality of radar parameters for the radar device based on the received radar information;
receiving, from the client device via a computer network, the updated operating parameters that are updated over time based on the current performance of the radar device;
receiving a geographic location for the radar device;
retrieving geographic data about a geographic region associated with the geographic location for the radar device;
computing one or more measures of performance for the radar device based on the plurality of radar parameters, the updated operating parameters, and the geographic data, wherein the one or more measures of performance include a predicted area of radar signal coverage;
receiving target information for a target to be detected by the radar;
retrieving a plurality of target parameters for the target to be detected by the radar device;
receiving updated travel parameters of the target to be detected by the radar device, wherein the updated travel parameters are updated over time based on current operation of the target as the target moves along a path of travel;
computing a probability of detection of the target to be detected by the radar device based on the plurality of radar parameters, the updated operating parameters, the geographic data, the plurality of target parameters, and the updated travel parameters of the target; and
generating a graphical user interface including a map including a visualization of the predicted area of radar signal coverage and the probability of detection of the target to be detected by the radar device, wherein the predicted area of radar signal coverage is updated based on the updated operating parameters of the radar device and the updated travel parameters of the target, wherein the probability of detection of the target to be detected by the radar device is updated based on the updated operating parameters of the radar device and the updated travel parameters of the target, and wherein the map including the visualization of the predicted area of radar signal coverage and the probability of detection of the target to be detected by the radar device is updated based on the updated operating parameters of the radar device and the updated travel parameters of the target.

13. The method in accordance with claim 12, wherein the radar device is mobile, wherein the geographic location for the radar device is a starting location of the radar device, and wherein the method further comprises:
retrieving a plurality of travel parameters for the radar device, including geographic data for the radar device based on the starting location and the plurality of travel parameters; and
computing the one or more measures of performance for the radar device based on the plurality of travel parameters and the geographic data.

14. The method in accordance with claim 12, and wherein the method further comprises:
retrieving weather information associated with the geographic location; and
computing one or more measures of performance for the radar device based on the plurality of radar parameters, the geographic data, and the weather information.

15. The method in accordance with claim 12, wherein the one or more measures of performance of the radar device include one or more of probability of detection, quality of service, and receiver operating characteristic curve.

16. The method in accordance with claim 12, wherein the one or more measures of performance for the radar device include a receiver operating characteristic curve for the radar device, and wherein the graphical user interface includes a visual representation of the receiver operating characteristic curve.

17. A radar performance analysis computer device comprising at least one processor in communication with at least one memory device, wherein the at least one processor is programmed to:
receive radar information about a radar device to be analyzed from a client device in communication with the radar device, wherein the radar device is configured to generate updated operating parameters for the radar device that are updated over time based on current performance of the radar device, and send the updated operating parameters for the radar device to the client device as the updated operating parameters are updated over time;

retrieve a plurality of radar parameters for the radar device based on the received radar information;

receive, from the client device via a computer network, the updated operating parameters that are updated over time based on the current performance of the radar device;

receive a geographic location for the radar device;

retrieve geographic data about a geographic region associated with the geographic location for the radar device;

compute one or more measures of performance for the radar device based on the plurality of radar parameters, the updated operating parameters, and the geographic data, wherein the one or more measures of performance include a predicted area of radar signal coverage;

receive target information for a target to be detected by the radar device;

retrieve a plurality of target parameters for the target to be detected by the radar device;

receive updated travel parameters of the target to be detected by the radar device, wherein the updated travel parameters are updated over time based on current operation of the target as the target moves along a path of travel;

compute a probability of detection of the target to be detected by the radar device based on the plurality of radar parameters, the updated operating parameters, the geographic data, the plurality of target parameters, and the updated travel parameters of the target; and generate a graphical user interface including a map including a visualization of the predicted area of radar signal coverage and the probability of detection of the target to be detected by the radar device, wherein the predicted area of radar signal coverage is updated based on the updated operating parameters of the radar device and the updated travel parameters of the target, wherein the probability of detection of the target to be detected by the radar device is updated based on the updated operating parameters of the radar device and the updated travel parameters of the target, and wherein the map including the visualization of the predicted area of radar signal coverage and the probability of detection of the target to be detected by the radar device is updated based on the updated operating parameters of the radar device and the updated travel parameters of the target.

18. The radar performance analysis computer device in accordance with claim 17, wherein the radar device is mobile, wherein the geographic location for the radar device is a starting location of the radar device, and wherein the at least one processor is further programmed to:

retrieve a plurality of travel parameters for the radar device, including geographic data for the radar device based on the starting location and the plurality of travel parameters; and compute the one or more measures of performance for the radar device based on the plurality of travel parameters and the geographic data.

19. The radar performance analysis computer device in accordance with claim 17:

retrieve weather information associated with the geographic location; and compute one or more measures of performance for the radar device based on the plurality of radar parameters, the geographic data, and the weather information.

20. The radar performance analysis computer device in accordance with claim 17, wherein the one or more measures of performance for the radar device include a receiver operating characteristic curve for the radar device, and wherein the graphical user interface includes a visual representation of the receiver operating characteristic curve.

* * * * *